Figure 1:
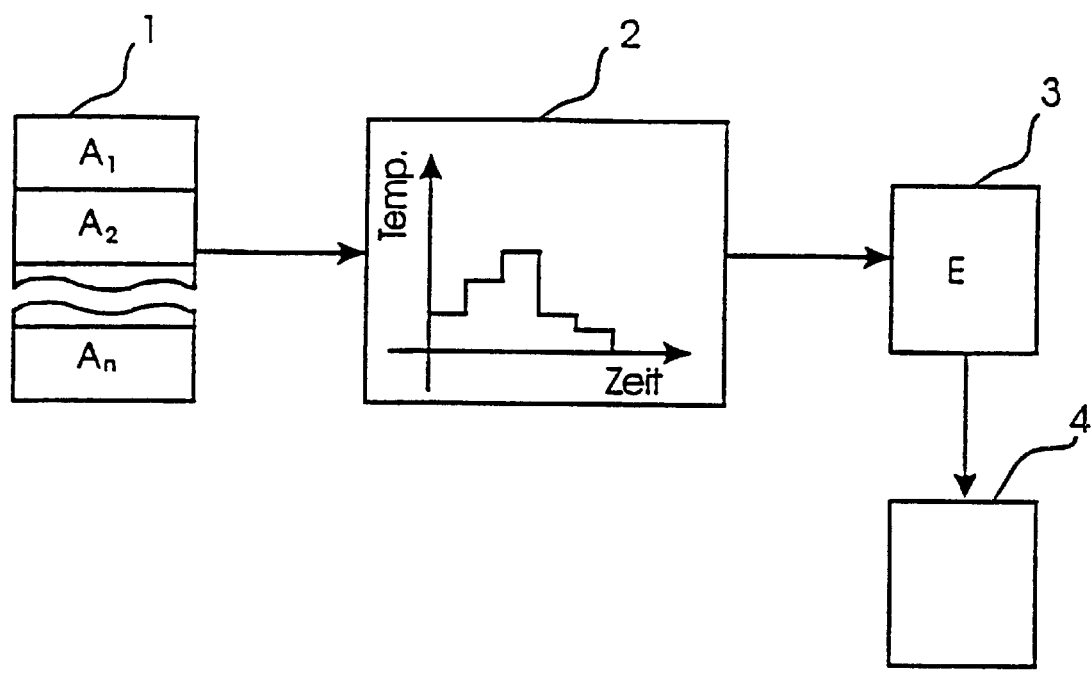

United States Patent

Schwenk et al.

[11] Patent Number: 5,935,693
[45] Date of Patent: Aug. 10, 1999

[54] DATA CARRIER

[75] Inventors: Gerhard Schwenk, Puchheim; Ulrich Scholz, Munich; Ulrich Magg, Feldgeding; Johannes Leist, Munich, all of Germany

[73] Assignee: Giesecke & Devrient GmbH, Munich, Germany

[21] Appl. No.: 09/030,254

[22] Filed: Feb. 25, 1998

Related U.S. Application Data

[62] Division of application No. 08/742,161, Nov. 1, 1996, Pat. No. 5,795,379.

[30] Foreign Application Priority Data

Nov. 3, 1995 [DE] Germany .......................... 195 41 054

[51] Int. Cl.$^6$ ....................................................... B41M 5/00
[52] U.S. Cl. ...................... 428/207; 428/211; 428/423.1; 428/327; 428/690; 428/916
[58] Field of Search .................... 106/499, 241, 106/272; 523/137; 428/690, 916, 327, 423.1, 537.5, 207

[56] References Cited

U.S. PATENT DOCUMENTS

| | | | |
|---|---|---|---|
| 3,741,907 | 6/1973 | Beyerlin | 252/301.2 R |
| 4,428,978 | 1/1984 | Jabs et al. | 427/150 |
| 4,639,502 | 1/1987 | Müller et al. | 528/45 |
| 4,735,984 | 4/1988 | Gouji et al. | 524/315 |
| 4,761,255 | 8/1988 | Dahm et al. | 264/4.7 |
| 5,052,380 | 10/1991 | Polta | 128/90 |
| 5,164,126 | 11/1992 | Kalishek et al. | 264/4.7 |

FOREIGN PATENT DOCUMENTS

| | | |
|---|---|---|
| 1609913 | 11/1985 | European Pat. Off. . |
| 292702 | 11/1988 | European Pat. Off. . |
| 2063948 | 7/1972 | Germany . |
| 1174308 | 12/1969 | United Kingdom . |

*Primary Examiner*—Bruce H. Hess
*Assistant Examiner*—Chris Cronin
*Attorney, Agent, or Firm*—Bacon & Thomas

[57] ABSTRACT

The present invention relates to a data carrier which contains a novel pigment composition which is preferably applied to the data carrier in the form of a coding. The pigment composition comprises a dye and a solid resin. The dye is bound in the solid resin. The resin is produced as the reaction product obtained from an oligomerized polyisocyanate and a mixture of polyfunctional compounds with active hydrogen.

16 Claims, 1 Drawing Sheet

DATA CARRIER

This application is a Division of nonprovisional application Ser. No. 08/742,161 filed Nov. 1, 1996 now U.S. Pat. No. 5,795,389.

This invention relates to a pigment composition having a dye and a solid resin, the dye being bound in the solid resin.

For producing inks or colors it is often first necessary to embed the dyes used in a solid resin layer, thereby fixing them in the resin. This increases the color fastness of the dye used. The dye-containing resins can then be ground finely into pigments and added to the particular binders to produce colors so that the desired inks arise.

Such a pigment is known for example from DE-OS 20 63 948 (U.S. Pat. No. 3,741,907). This publication describes the production of a fluorescent pigment whereby a fluorescent dye is mixed into a resin. The resins used are ones produced by polyaddition of a low-molecular polyol with a monomeric aliphatic and/or monomeric cycloaliphatic diisocyanate and optionally further components. For producing the pigment the fluorescent dye and the other components, the polyol and the diisocyanate, are mixed and crosslinked with an exothermic reaction course.

However the use of such resins has the disadvantage that the diisocyanates used as starting materials involve considerable health risks so that high safety requirements must be met during processing. For example these substances are toxic when inhaled.

The problem of the invention is accordingly among other things to propose a pigment and a method for producing it whereby the production process is unobjectionable in terms of safety and industrial medicine, the pigment is producible by a continuous manufacturing process and has improved quality properties.

This problem is solved according to the invention by the features stated in the independent claims.

The basic idea of the invention is to produce the pigment by binding a dye in a resin, the resin being produced from the reaction of solid, oligomerized diisocyanates and a mixture of polyfunctional compounds with active hydrogen. The inventive method uses a reaction unit which allows passage of the bulk blend of the abovementioned starting materials. The use of oligomerized polyisocyanates in lieu of conventionally used monomeric diisocyanates results in a number of advantages. For example it permits the process to be conducted unobjectionably in terms of safety and industrial medicine since this starting material is not known to involve any special dangers up to now. If the reaction is conducted as a continuous process it is possible to influence the process by varying the process parameters such as process time, mixing rate or the like. One can thus control the degree of polymerization of the reaction mixture and thus the hardness of the produced resin. By additionally providing heating zones in the process unit one can adjust a temperature profile with which the reaction can furthermore be adjusted optimally to the desired final product.

In a preferred embodiment the pigment is produced by binding a dye in a resin whereby the oligomerized polyisocyanate used is a trimerized diisocyanate, preferably a derivative of isophorone diisocyanate. This trimerized diisocyanate is mixed with a diamine or polyamine and fed to a worm extruder together with the dye. In the worm extruder the mixture passes through a temperature profile which is realized by providing different heating zones in the extruder. After the reaction time a tough product emerges at the end of the extruder, subsequently being comminuted to the necessary pigment size in a comminuting unit.

The properties of the final product can be influenced via the process parameters in the extruder. It is furthermore possible to feed to the mixture a so-called chain stopper which preferably consists in a monofunctional compound with active hydrogen and is preferably selected from the group of amines or amides.

Further advantages and advantageous embodiments can be found in the description of the following figures, which are deliberately not true to scale in order to be easier to understand.

FIG. 1 shows a schematized representation of the reaction course in the inventive production method.

FIG. 1 schematically describes the reaction course of the inventive method. Starting materials $A_1$ to $A_n$ necessary for producing the pigment are brought together in unit 1 and optionally already mixed. The starting materials are at least an oligomerized polyisocyanate, a dye and a polyfunctional compound with active hydrogen. The oligomerized polyisocyanate is preferably a trimerized diisocyanate, in particular a derivative of isophorone diisocyanate.

The polyfunctional compound with active hydrogen is usually selected from the group of amines, amides, alcohols and carboxylic, sulfonic and phosphonic acids. One preferably uses urea, melamine, sulfamide, sulfanilamide, aminobenzamide and derivatives thereof. These starting materials are mixed homogeneously into a bulk blend and fed to reaction unit 2, in particular a worm extruder. In reaction unit 2 the bulk blend is mixed further and passes through a temperature profile which starts the reaction process of the oligomerized polyisocyanate with the polyfunctional compounds into the desired solid resin, the dye being bound in the arising resin at the end of this process.

This procedure leads to final product E which is substantially a solid resin with a bound dye and is collected in a vessel or means of transportation. Final product E is then fed to further processing unit 4 in which the final product is comminuted to pigment size. One preferably uses a mill with which the desired pigment size can be adjusted.

The dyes suitable for use are basically subject to no restrictions so that a wide assortment of dyes can be used for producing the pigments. For example fluorescent dyes can be employed for producing fluorescent pigments, whereby in particular chelates from the group of rare earths can be used. However other functional dyes, for example daylight luminous dyes, thermochromic or photochromic dyes and infrared-absorbent or infrared-fluorescent dyes, can also be used individually or in combination with each other. One can use dyes which absorb one or more wavelengths from the visible spectral region, or reagent dyes which change one of their properties under certain conditions, such as the influence of a certain radiation or the presence of other reagents.

Final product E must at least after cooling have a brittleness which is great enough to permit grinding to the necessary pigment fineness in comminuting unit 4. By varying the starting materials as well as the reaction parameters in unit 2 one can thus influence the properties of final product E to such an extent as to achieve an optimal result for the particular case of application.

These pigment particles can then be added to a binder in the desired concentration so that versatile inks arise.

Alongside many other possible applications, the fluorescent pigments can be employed in particular in inks which are used in security-relevant areas. One prints these inks on data carriers, such as security documents, papers of value, bank notes, identity cards or security-relevant cards, to obtain a marking or protection-of such documents.

However a thus produced ink can also be used in other areas to provide data carriers with an authenticity marking.

For example one can mark the packages of special high-quality products or these products themselves using the inventive ink so as to permit their authenticity to be proven at any time. Marking products can be advantageous in many cases, in particular in areas in which imitation of the products or product piracy is already possible using simple means. Well-known examples include marking the packaging of EDP programs, diskettes, CDs or other high-quality articles of sale.

In the following the inventive method and the inventive coloring pigment will be explained further using some examples.

EXAMPLE 1

Starting materials 62.75 mass % oligomerized diisocyanate 9.89 mass % melamine 12.36 mass % p-toluenesulfonamide 15.00 mass % CD331 fluorescent dye The stated components are added to an extruder as a powder mixture via a metering device. Synthesis takes place by reaction extrusion at an extruder temperature of 220° C.

EXAMPLE 2

Starting materials 56.37 mass % trimerized diisocyanate 10.07 mass % melamine 18.56 mass % benzamide 15.00 mass % CD331 fluorescent dye The components are added to an extruder as a powder mixture via a metering device. Synthesis takes place by reaction extrusion at an extruder temperature of 210° C.

EXAMPLE 3

Starting materials 62.78 mass % trimerized diisocyanate 11.21 mass % melamine 20.67 mass % benzamide 5.34 mass % Uvitex OB fluorescent dye The components are added to an extruder as a powder mixture via a metering device. Synthesis takes place by reaction extrusion at an extruder temperature of 210° C.

EXAMPLE 4

Starting materials 60.60 mass % trimerized diisocyanate 10.84 mass % melamine 9.56 mass % benzamide 4.00 mass % urea 15.00 mass % CD335 fluorescent dye The components are added to an extruder as a powder mixture via a metering device. Synthesis takes place by reaction extrusion at an extruder temperature of 260° C.

In the above examples the dye content can also be varied so as to produce fluorescent pigments with dye content F where $0<F\leq 50\%$. The particular synthesis product resulting from each example can be used as a printing pigment.

We claim:

1. A data carrier containing a pigment composition; said pigment composition comprising a dye and a solid resin, the dye being bound in the solid resin, wherein the resin is a reaction product from an oligomerized polyisocyanate and a mixture of polyfunctional compounds with active hydrogen.

2. The data carrier of claim 1 wherein said mixture additionally contains a chain stopper.

3. The data carrier of claim 2 wherein the chain stopper is selected from the group consisting of monofunctional, hydrogen-active compounds.

4. The data carrier of claim 3 wherein the chain stopper is selected from the group consisting of amines, amides, alcohols, carboxcylic, sulfonic, and phosphonic acids.

5. The data carrier of claim 1 wherein the oligomerized polyisocyanate is a trimerized diisocyanate.

6. The data carrier of claim 5 wherein the trimerized diisocyanate is a derivative of isophorone diisocyanate.

7. The data carrier of claim 1 wherein the polyfunctional compound with active hydrogen is selected from the group consisting of amines, amides, alcohols and carbocyclic, sulfonic and phosphonic acids.

8. The data carrier of claim 7 wherein the polyfunctional compound with active hydrogen is selected from the group consisting of urea, melamine, sulfamide, sulfanilamide, aminobenzamide, thiourea and derivatives thereof.

9. The data carrier of claim 1 wherein the dye is a fluorescent dye.

10. The data carrier of claim 4 wherein the fluorescent dye is a chelate selected from the group consisting of rare earths.

11. The data carrier of claim 1 wherein the dye is selected from the group consisting of daylight luminous dye, a thermochromic dye, a photochromic dye, an infrared-absorbent dye, an infrared fluorescent dye and mixtures thereof.

12. The data carrier of claim 1 wherein the dye absorbs a wavelength of the visible spectral region.

13. The data carrier of claim 1 wherein said data carrier is a security document.

14. The data carrier of claim 1 wherein said data carrier is a EDP program, diskette, or CD, or the packaging thereon.

15. The data carrier of claim 1 wherein said pigment composition is printed on said carrier in the form of a coding.

16. In a data carrier which comprises a carrier substrate with indicia thereon, said indicia comprising a pigment containing composition;

wherein the improvement comprises the selection of a pigment used in said composition, said pigment consisting essentially of a solid resin containing a dye bound therein, said resin being the reaction product of an oligomerized polyisocyanate, a polyfunctional compound having active hydrogen and optionally a chain stopper.

* * * * *